United States Patent
Pfeifer et al.

(10) Patent No.: US 10,411,965 B2
(45) Date of Patent: Sep. 10, 2019

(54) METHOD AND A MOBILE AD-HOC NETWORK FOR THE EFFECTIVE IDENTIFICATION OF NEIGHBORING NODES

(71) Applicant: ROHDE & SCHWARZ GMBH & CO. KG, Munich (DE)

(72) Inventors: Hagen Pfeifer, Munich (DE); Gerhard Gläser, Langenfeld (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 589 days.

(21) Appl. No.: 14/405,381

(22) PCT Filed: Jun. 3, 2013

(86) PCT No.: PCT/EP2013/061400
§ 371 (c)(1),
(2) Date: Dec. 3, 2014

(87) PCT Pub. No.: WO2013/186075
PCT Pub. Date: Dec. 19, 2013

(65) Prior Publication Data
US 2015/0113127 A1    Apr. 23, 2015

(30) Foreign Application Priority Data

Jun. 11, 2012   (DE) .................. 10 2012 209 680

(51) Int. Cl.
*G06F 15/16* (2006.01)
*H04L 12/24* (2006.01)
(Continued)

(52) U.S. Cl.
CPC .............. *H04L 41/12* (2013.01); *H04L 69/28* (2013.01); *H04W 8/005* (2013.01); *H04W 40/246* (2013.01); *H04W 84/18* (2013.01)

(58) Field of Classification Search
CPC ........ H04L 41/12; H04L 69/28; H04W 8/005; H04W 40/246; H04W 84/18
(Continued)

(56) References Cited

U.S. PATENT DOCUMENTS 8,165,065 B2 * 4/2012 Michaels .............. H04W 48/16
370/328
2002/0140289 A1 * 10/2002 McConnell ............. B60R 11/02
307/10.1
(Continued)

FOREIGN PATENT DOCUMENTS

DE      603 05 696 T2   10/2006
GB      2 423 891 A     9/2006
WO      2011/154911 A1  12/2011

OTHER PUBLICATIONS

Written Opinion of the Intellectual Property Office of Singapore for Singaporean Application No. 10201608604V, dated Apr. 21, 2017, 7 Pages.
(Continued)

Primary Examiner — Jeffrey R Swearingen
Assistant Examiner — Oluwatosin M Gidado
(74) Attorney, Agent, or Firm — Ditthavong & Steiner, P.C.

(57) ABSTRACT

In a method for the effective identification of neighboring nodes in a mobile ad-hoc network, every node transmits within a given time raster ($\Delta T_1$, $\Delta T_2$, $\Delta T_3$) a message signalling its presence (1), which is acknowledged through transmission of an acknowledgement message (2) by at least one node which receives the message signalling a presence (1) for the first time. The time raster ($\Delta T_2$, $\Delta T_3$) within which the message signalling a presence (1) is transmitted is varied by a node which is disposed outside an ad-hoc network.

10 Claims, 3 Drawing Sheets

(51) Int. Cl.
  *H04W 8/00* (2009.01)
  *H04W 40/24* (2009.01)
  *H04L 29/06* (2006.01)
  *H04W 84/18* (2009.01)

(58) Field of Classification Search
  USPC ........................................................ 709/224
  See application file for complete search history.

(56) References Cited

U.S. PATENT DOCUMENTS

| | | | | |
|---|---|---|---|---|
| 2003/0128690 | A1* | 7/2003 | Elliott | H04W 8/005 |
| | | | | 370/351 |
| 2004/0005902 | A1* | 1/2004 | Belcea | H04J 3/0667 |
| | | | | 455/502 |
| 2004/0018839 | A1 | 1/2004 | Andric et al. | |
| 2008/0010299 | A1* | 1/2008 | Ogawa | G06F 17/30206 |
| 2012/0039177 | A1* | 2/2012 | Kubisch | H04W 8/005 |
| | | | | 370/241 |
| 2012/0127977 | A1* | 5/2012 | Copeland | H04L 1/0015 |
| | | | | 370/338 |
| 2015/0289163 | A1* | 10/2015 | Mineta | H04B 1/707 |
| | | | | 370/320 |

OTHER PUBLICATIONS

Mosko et al., "A self-correcting neighbor protocol for mobile ad-hoc wireless networks", University of California at Santa Cruz, Baskin Engineering, Santa Cruz, CA, published in Computer Communications and Networks, 2002, IEEE, dated May 16, 2017 from "www.dtic.mil/cgi-bin/GetTRDoc?AD=ADA461662", 5 pages.

PCT Notification of Transmittal of Translation of the International Preliminary Report on Patentability and Written Opinion of the International Searching Authority corresponding to PCT/EP2013/061400, dated Dec. 24, 2014; 7 pages.

Joon et al., "Control overhead reduction for neighbour knowledge acquisition in mobile ad hoc networks", Electronics Letters, IEEE Stevenage,GB, vol. 39, No. 9, May 1, 2003, pp. 740-741.

* cited by examiner

Key:
○ : Node disposed outside an ad-hoc network
● : Node disposed inside an ad-hoc network
◌ : Transmission range of the node

METHOD AND A MOBILE AD-HOC NETWORK FOR THE EFFECTIVE IDENTIFICATION OF NEIGHBORING NODES

CROSS-REFERENCE TO RELATED APPLICATION

The present application is a national phase application of PCT Application No. PCT/EP2013/061400, filed Jun. 3, 2013, and claims priority to German Application No. DE 10 2012 209 680.9, filed on Jun. 11, 2012, the entire contents of which are herein incorporated by reference.

BACKGROUND OF THE INVENTION

Field of the Invention

The invention, according to the various embodiments described herein, relates to a method for the effective identification of neighboring nodes in a mobile ad-hoc network, accordingly a corresponding network.

Discussion of the Background

In mobile networks without infrastructure—so-called ad-hoc networks—the management, the monitoring and the control of the data traffic is processed directly between the individual network participants—the so-called network-nodes respectively nodes.

In this context, one substantial function is the planning of the route from the transmitting node to the receiving node, the so-called routing. Accordingly, the routing between the transmitting node and the receiving node can typically be implemented via several intermediate nodes. For a multi-hop routing of this kind, two classes of routing method have been established in principle.

In the case of proactive routing, the direct neighbor nodes of every individual node in an ad-hoc network are determined in each case within a given time raster and stored in a routing table which is notified to all nodes of an ad-hoc network via selected nodes. By contrast, in the case of reactive routing, the respective neighbor nodes of every individual node in the transmission corridor between the transmitting node and the receiving node are determined uniquely in the case of a transmission request of a node shortly before the transmission and communicated to the individual nodes within the transmission corridor.

The data traffic for determining the neighbor nodes of every individual node and the data traffic for notifying the respective neighborhood nodes of every individual node in the overall ad-hoc network requires transmission capacity which significantly minimises the transmission efficiency within the ad-hoc network. Conversely, because of the network nodes accessing and departing from the mobile ad-hoc network, a mobile ad-hoc network is typically highly variable and requires a continuous and rapid updating of the knowledge required for the proactive routing method regarding the nodes positioned in each case directly adjacent to every node of the ad-hoc network. For existing proactive routing methods, the topology of the ad-hoc network—that is, the knowledge regarding the distribution of the individual nodes in the ad-hoc network—is therefore determined within a time raster which represents a compromise between the degree of actuality of the topology of the ad-hoc network and the transmission efficiency within the ad-hoc network.

For a node which is disposed outside an ad-hoc network and which would accordingly seek to integrate as quickly as possible into an existing ad-hoc network or to establish a new ad-hoc network with another node also disposed outside an ad-hoc network, it is not feasible merely to announce its presence to potential neighbor nodes in a time raster extended on the basis of a compromise.

SUMMARY OF THE INVENTION

According to one embodiment, a method for determining the topology of an ad-hoc network and an associated ad-hoc network in order to allow a node disposed outside an ad-hoc network to integrate as quickly as possible into an ad-hoc network, is herein provided.

Every node may display its presence in the ad-hoc network through transmission of a message signalling a presence—typically a so-called "hello message"—within a given, constant time raster, which is acknowledged with an acknowledgement message from every further node of the ad-hoc network which receives the message signalling a presence for the first time. According to one embodiment, a node which is disposed outside an ad-hoc network may transmit the message signalling a presence in a varied time raster.

According to another embodiment, the variation of the time raster in which a node disposed outside an ad-hoc network transmits a message signalling a presence allows a notification of the node disposed outside an ad-hoc network to potential neighbor nodes as quickly as possible and accordingly an integration of the node disposed outside an ad-hoc network into an ad-hoc network with at least one potential neighbor node as quickly as possible.

The node disposed outside an ad-hoc network, which moves to a position outside an ad-hoc network either by starting up, that is, for example, by switching on the operating voltage, at a position outside an ad-hoc network or, if already started, which moves from a position inside an ad-hoc network to a position outside an ad-hoc network, may preferably initially select a comparatively longer time raster for the transmission of a message signalling a presence, in order promptly to receive for the first time and to acknowledge with an acknowledgement message—even before the transmission of its own message signalling a presence—a message signalling a presence transmitted from a potential neighbor node.

Since a common ad-hoc network between two nodes is realized from the time at which the two nodes have made themselves known to one another, the acknowledgement of a message signalling a presence received from a neighbor node through transmission of an acknowledgement message represents the fastest possibility for a node disposed outside an ad-hoc network to integrate itself into an existing ad-hoc network or to establish a new ad-hoc network, because, in this case, only the transmission of an acknowledgement message may be required.

With the progress of time, during which the probability for the reception of a message signalling a presence transmitted from a potential neighbor node decreases, the node disposed outside an ad-hoc network may preferably reduce the time raster within which it transmits a message signalling a presence in order to make itself known to a potential neighbor node as promptly as possible, to come into contact with it and accordingly to integrate itself into an existing ad-hoc network with the potential neighbor node or to establish a new ad-hoc network with a potential neighbor node.

The reduction of the time raster is preferably continued until the time raster reaches a previously specified minimal value. This minimal-value time raster may be retained by the node disposed outside an ad-hoc network until it is integrated in the ad-hoc network.

Additionally, according to another embodiment, in order to accelerate the integration of a node disposed outside an ad-hoc network into an existing ad-hoc network or the establishment of a new ad-hoc network between two nodes disposed outside an ad-hoc network, every message signalling a presence received by a node may be preferably acknowledged as quickly as possible with an acknowledgement message.

In one another embodiment, the acknowledgement with an acknowledgement message is implemented immediately after the reception of a message signalling a presence. In yet another embodiment, the acknowledgement with an acknowledgement message may be slightly delayed by a statistical delay time associated with the respective node in order to prevent a simultaneous acknowledgement of the message signalling a presence by several nodes receiving this message signalling a presence and accordingly a blockage in the ad-hoc network.

The time of the reception of an acknowledgement message in the node which has transmitted the message signalling a presence to be acknowledged preferably represents the time of the start of an ad-hoc network between the node transmitting a message signalling a presence and the node acknowledging the message signalling a presence with an acknowledgement message and additional nodes which are already operating an existing ad-hoc network with one of the two nodes.

A node which acknowledges a received message signalling a presence with an acknowledgement message therefore knows that it will shortly be integrated in an ad-hoc network, and, like every other node which belongs to an ad-hoc network, may therefore transmit its messages signalling a presence within a previously specified, constant time raster, preferably from the time of the transmission of an acknowledgement message. In an equivalent manner, provided it does not already belong to an ad-hoc network, a node which receives an acknowledgement message and therefore knows that it now belongs to an ad-hoc network will therefore, like every other node which belongs to an ad-hoc network, preferably transmit its messages signalling a presence within a previously specified, constant time raster from the time of the reception of an acknowledgement message.

If a node which transmits a message signalling its presence and is knowingly disposed in an ad-hoc network at this time, does not receive a message signalling a presence from another node of the ad-hoc network within a previously specified time interval, then it may be knowingly disposed outside an ad-hoc network.

While the formation of an ad-hoc network between at least two nodes is activated with the reception of the acknowledgement message of one of the two nodes by the respectively other of the two nodes, a secured, bi-directional transmission between these two nodes—that is, the presence of a secured, symmetrical transmission between the two nodes—may preferably only given if both nodes know that their transmitted message has been correctly received by the respectively other node. This is preferably only the case if one of the two nodes receives a further acknowledgement message which the respectively other node transmits upon receiving the acknowledgement message transmitted by one of the two nodes.

By preference, the method according to the embodiments for an effective identification of neighboring nodes in a mobile ad-hoc network is used in the preliminary stages of a proactive routing method—routing method—which operates with the so-called Optimised Link State Routing (OLSR) protocol—Optimised Link State Routing protocol.

BRIEF DESCRIPTION OF THE DRAWINGS

Exemplary embodiments of the method according to the invention for the effective identification of neighboring nodes in a mobile ad-hoc network and of the associated ad-hoc network are explained in detail in the following with reference to the drawings by way of example. The figures of the drawings show.

In the following, an exemplary embodiment of the method according to the invention for the effective identification of neighboring nodes in a mobile ad-hoc network represented by the flow chart in FIG. 3 and the associated exemplary embodiment of the ad-hoc network will be explained in detail in the scenarios represented in FIGS. 2A to 2D.

In the first method step S10 of the method according to one embodiment, a network node, for example, a mobile-radio device or cellular-radio device,—referred to by way of abbreviation in the following as a node—starts to operate, for example, in that the user of a device representing a node switches on the operating voltage and the device runs through the conventional initialisation routines. After the completion of this start-up, the node is typically still not integrated in an ad-hoc network.

Alongside a node which implements a new start-up, a node which was still integrated in an ad-hoc network shortly before and has left the ad-hoc network through a regional change of its position relative to the transmission range of the ad-hoc network, can, in an equivalent manner, also find itself in the situation of no longer being integrated in an ad-hoc network and accordingly of seeking participation in an ad-hoc network as quickly as possible.

For this purpose, in the next method step S20, the node disposed outside an ad-hoc network transmits a message signalling its presence which is typically a "hello message" ("hello message") and is supposed to indicate the presence of the node in the region to the potential neighbor nodes present in the region. Such a message signalling a presence typically contains only information about the identity of the node—typically identification number of the node—and the transmission time of the message signalling its presence at a local time of the node, which is preferably referenced to a reference-time source—for example, the Global Position System (GPS) time.

Figure 1:
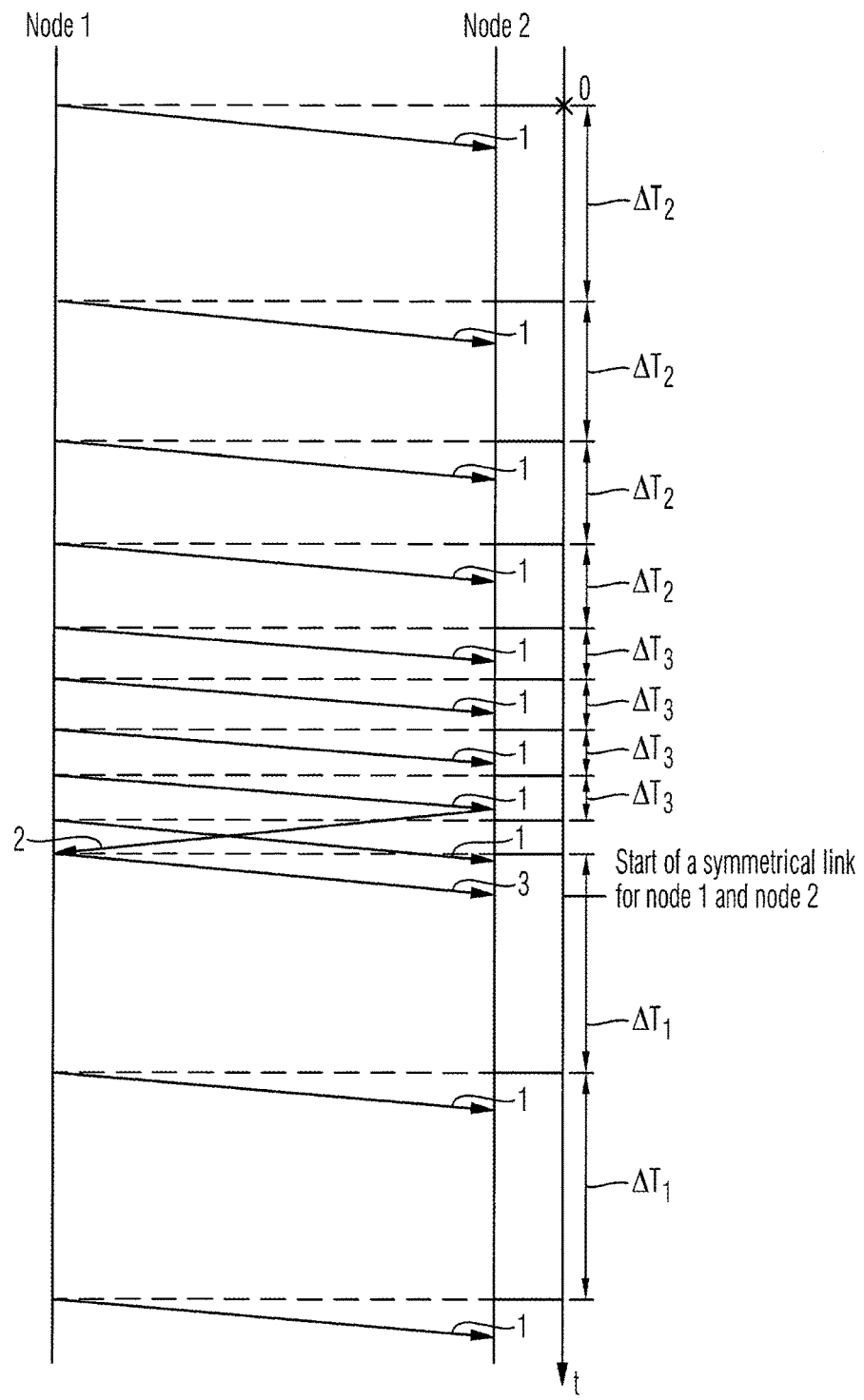
FIG. 1 a time diagram of the messages signalling a presence and associated acknowledgement messages, according to one embodiment.

The time raster $\Delta T_2$ in which the node disposed outside an ad-hoc network transmits its messages signalling its presence 1 is comparatively high, as shown in FIG. 1, at the beginning of the search for an ad-hoc network and, also as shown in FIG. 1, is reduced successively. This guarantees that, at the beginning of its search for an ad-hoc network, before it transmits its first message signalling its presence 1, the node has a sufficiently long time at its disposal to receive correctly a message signalling a presence 1 transmitted by a potential neighbor node. In fact, a correct reception of a message signalling a presence 1 transmitted from a potential neighbor node is not possible for a node in parallel with the transmission of a message signalling a presence 1, because parallel transmission and reception is not possible in simplex traffic.

The relatively higher prioritization of the reception of a message signalling a presence 1 transmitted from a potential neighbor node by comparison with the transmission of a message signalling a presence 1 allows the node disposed outside an ad-hoc network to integrate itself as quickly as possible into an existing ad-hoc network with a neighbor node or to establish an ad-hoc network with a neighbor node as quickly as possible, since the integration of the ad-hoc network-seeking node is completed with the reception by the node which transmitted the message signalling a presence 1 of an acknowledgement message 2 to the received message signalling a presence 1 transmitted by the node.

In the next method step S30, the node seeking an ad-hoc network attempts to identify the reception of an acknowledgement message 2 of the potential neighbor node, which the potential neighbor node radiates to the node by way of acknowledgement upon the reception of the message signalling a presence 1. If the node identifies the reception of such an acknowledgement message 2, it then recognizes that it is positioned within the transmission range of the potential neighbor node. With the occurrence of this condition, the node seeking an ad-hoc network with the potential neighbor node respectively with additional nodes which are already disposed in an ad-hoc network with potential neighbor nodes, is disposed in a common ad-hoc network.

Furthermore, at this time, the seeking node recognizes that a secured bi-directional transmission is present between itself and the potential neighbor node, because, on the one hand, a potential neighbor node has securely received a message transmitted by itself, and, on the other hand, it has itself securely received a message transmitted from the potential neighbor node.

If the seeking node identifies the reception of an acknowledgement message 2 radiated from a potential neighbor node to a message signalling a presence 1 radiated from the seeking node, the seeking node is consequently disposed in an ad-hoc network, and the method according to one embodiment is continued with the method step S80 presented in greater detail below.

Otherwise, in the next method step S40, the node seeking an ad-hoc network attempts to identify the reception of a message signalling a presence 1 radiated from a potential neighbor node. For the case that the seeking node identifies the reception of a message signalling a presence 1 radiated from the potential neighbor node, the seeking node is positioned in the transmission range of a potential neighbor node and is accordingly capable of forming a common ad-hoc network with this potential neighbor node and additional nodes which already form an ad-hoc network with this potential neighbor node. Accordingly, it will acknowledge the received message signalling a presence 1 of the potential neighbor node with an acknowledgement message 2.

The foreseeable time of the reception by the potential neighbor node of the acknowledgement message 2 radiated from the seeking node represents for the seeking node the start of a common ad-hoc network between the seeking node and the potential neighbor node and additional nodes linked to the potential neighbor node within an already existing ad-hoc network.

In order to realize the time of the start of a common ad-hoc network as soon as possible, in a first embodiment, the seeking node will transmit the acknowledgement message 2 immediately after reception of the message signalling a presence 1 of the potential neighbor node. In a second embodiment, the seeking node will also radiate the acknowledgement message 2 as close in time as possible in order to realize the time of the start of the common ad-hoc network as soon as possible. However, in this second embodiment, the acknowledgement message 2 is delayed by a slight delay time $\Delta T_5$ associated with the respective node relative to the reception time of the message signalling a presence 1 of the potential neighbor node, in order to prevent a simultaneous acknowledgement of this received message signalling a presence 1 by other nodes in the transmission range of the potential neighbor node and thereby a blockage ad-hoc network.

The node foreseeably disposed in an ad-hoc network will consequently continue with method step S80 presented in greater detail below delayed by the transmission time of the acknowledgement message 2 and a statistical delay time possibly used in the second embodiment.

If no reception of a message signalling a presence 1 radiated from a potential neighbor node is identified by a node seeking an ad-hoc network, in the next method step S50, further messages signalling a presence 1 are radiated in an increasingly smaller time raster $\Delta T_2$ as shown in FIG. 1. The reduction of the time raster is meaningful, since, with increasing time in which the node seeking an ad-hoc network has received no message signalling a presence, the probability for the reception of a message signalling a presence 1 transmitted from a potential neighbor node decreases. The minimisation of the time raster for the transmission of a message signalling a presence 1 is continued until an appropriate, previously specified minimal-value time raster $\Delta T_3$ has been reached. As will be explained in detail below, this minimal-value time raster $\Delta T_3$ is retained until the seeking node is integrated in an ad-hoc network.

After the transmission of a further message signalling a presence 1, the seeking node will attempt, in the next method step S60 by analogy with method step S30, to identify the reception of an acknowledgement message 2 radiated from a potential neighbor node to a message signalling a presence 1 radiated by the seeking node. If the seeking node does not identify a reception of an acknowledgement message 2, in the next method step S70 by analogy with method step S40, it will attempt to identify the reception of a message signalling a presence 1 radiated from a potential neighbor node. For the case that the seeking node does not identify the reception of a message signalling a presence 1 radiated from a potential neighbor node, it will, according to method step S50, radiate a further message signalling a presence 1 in a further reduced time raster or in a minimal-value time raster.

If the node seeking an ad-hoc network has either identified the reception of an acknowledgement message 2 radiated from a potential neighbor node or the reception of a message signalling a presence 1 radiated from a potential neighbor node and is therefore disposed in a common ad-hoc network with the potential neighbor node and further nodes which already form an ad-hoc network with the potential neighbor node, in the next method step S80, as shown in FIG. 1, the seeking node will, like all other nodes disposed in an ad-hoc network, continuously radiate a message signalling a presence 1 within a previously specified, constant time raster $\Delta T_1$.

The node now disposed in an ad-hoc network will attempt, in the subsequent method step S90, to identify the reception of a message signalling a presence 1 radiated by further nodes, in each case associated with the ad-hoc network. If no further message signalling a presence of a node associated with the ad-hoc network is received by the node now disposed within an ad-hoc network within a previously specified time interval $\Delta T_4$ since the last reception time of a message signalling a presence of a further node of the ad-hoc network, the node will then recognize that it is no longer disposed within an ad-hoc network.

In this case, the node now disposed outside an ad-hoc network will radiate a message signalling a presence 1, according to method step S20, within a time raster $\Delta T_2$ minimising itself, as shown in FIG. 1, in the fastest possible search for a new ad-hoc network.

If the node receives a further message signalling a presence of this node, it is still disposed within the ad-hoc network. A departure of the node disposed in an ad-hoc network from the ad-hoc network is possible only within the framework of the concluding method step S100, if the node shuts down its operation, for example, in that the user of the device corresponding to the node switches off the operating voltage of the device and, within the framework of shutdown routines, then adopts a switched-off operating mode.

If the operation of the node in the final method step S100 is not shut down, the node disposed in an ad-hoc network transmits a further message according to method step S80 signalling a presence 1 in the constant time raster $\Delta T_1$.

At this point, it should be noted that not only the node disposed outside an ad-hoc network and therefore seeking an ad-hoc network, but all nodes—also those already disposed within an ad-hoc network—acknowledge a received message signalling a presence 1 through an acknowledgement message 2 in an accelerated manner, that is, therefore, according to the first embodiment, immediately after the reception of the message signalling a presence 1, or delayed by a statistical delay time $\Delta T_5$ assigned to the respective node relative to the reception time of the message signalling a presence 1.

Furthermore, as is evident from FIG. 1, it should be stated that, at the reception time of the acknowledgement message 2, the node 1 knows that its associated, transmitted message signalling a presence 1 has been securely received by the node 2, and accordingly, node 2 is securely disposed within the transmission range of node 1 and, at the same time, with the secure reception of the acknowledgement message 2 from node 2, that it is securely disposed within the transmission range of node 2.

Node 2 recognizes a secure transmission between node 1 and 2 only at the reception time of a further acknowledgement message 3 of node 1 to the reception of the acknowledgement message 2 from node 2. Only from this time, does a secure, symmetrical transmission link exist between node 1 and node 2.

FIGS. 2A to 2D show various scenarios of a changing ad-hoc network.

Figure 2A:
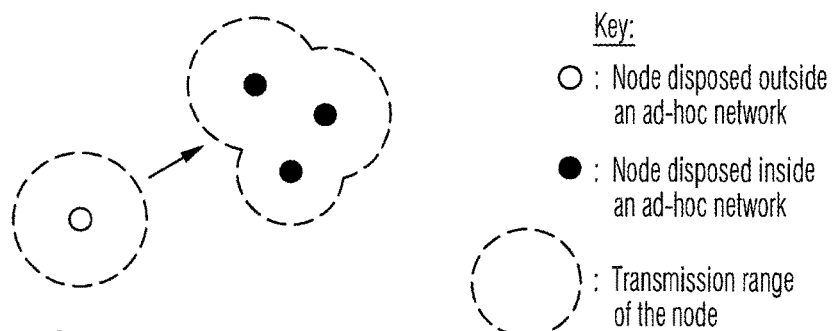
FIG. 2A a regional diagram of a first scenario of an ad-hoc network with nodes disposed inside and outside the ad-hoc network, according to one embodiment.
Figure 3:
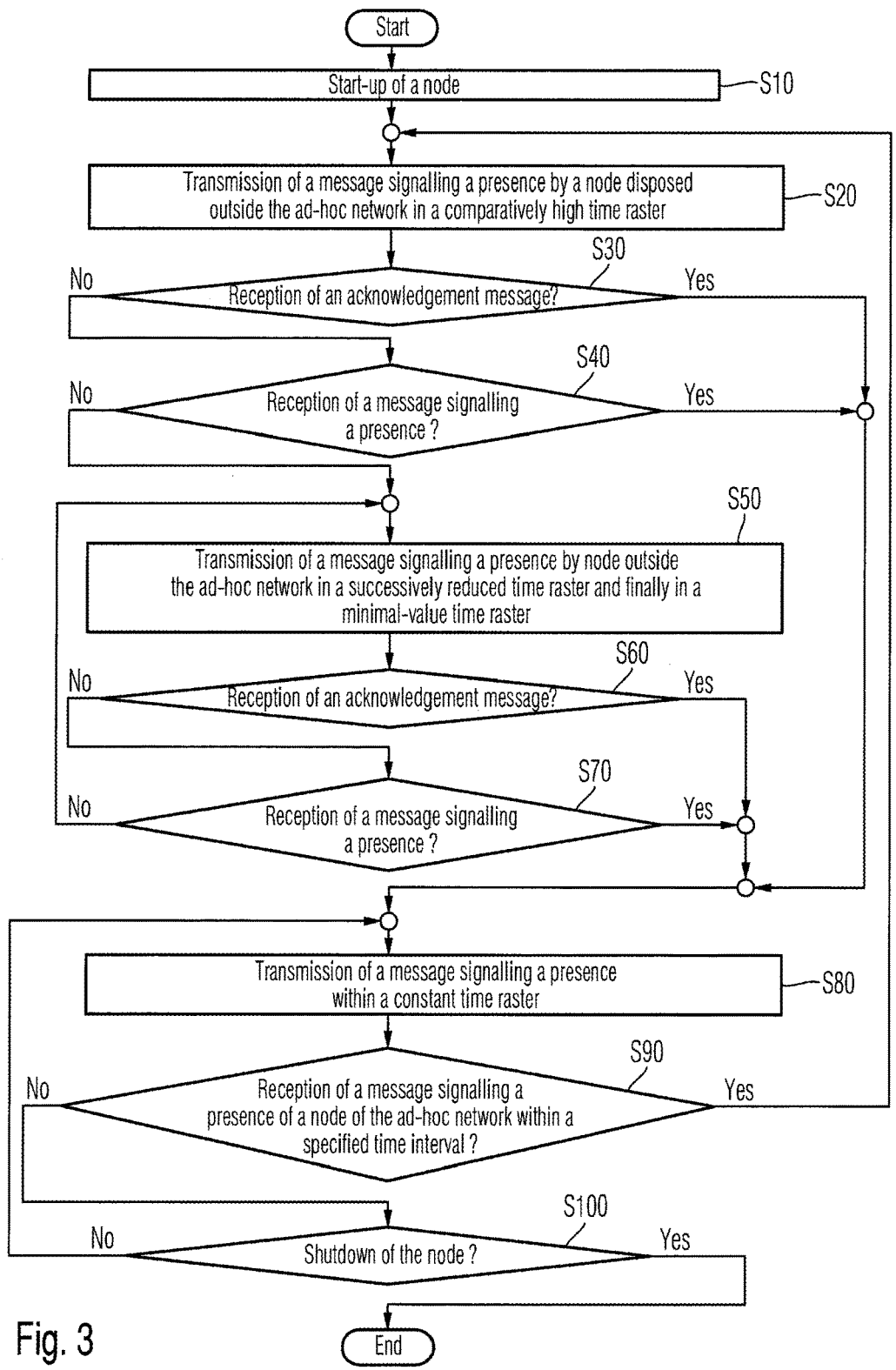

In FIG. 2A, a node disposed outside the transmission range of another node or of an already existing ad-hoc network—empty circle—is seeking an ad-hoc network and moves towards a group of three nodes—filled circles (see arrow), which are disposed within the transmission range relative to one another and accordingly within a common ad-hoc network.

Figure 2B:
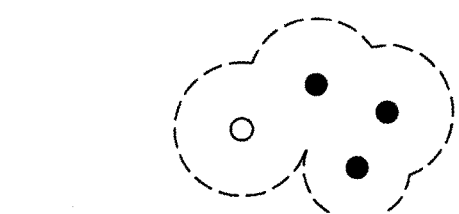
FIG. 2B a regional diagram of a second scenario of an ad-hoc network with nodes disposed inside and outside the ad-hoc network, according to one embodiment.

In FIG. 2B, the seeking node is already disposed in the transmission range of the ad-hoc network comprising three nodes but is not yet integrated into the ad-hoc network, since the message exchange (transmission of the message signalling a presence and an acknowledgement message) between the seeking node and at least one of the three nodes integrated in the ad-hoc network has not yet concluded.

Figure 2C:
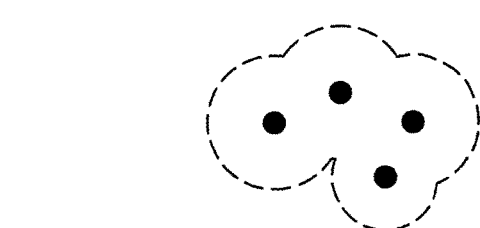
FIG. 2C a regional diagram of a third scenario of an ad-hoc network with nodes disposed inside the ad-hoc network, according to one embodiment.

In FIG. 2C, the message exchange has been completed and the seeking node is integrated in the ad-hoc network.

Figure 2D:
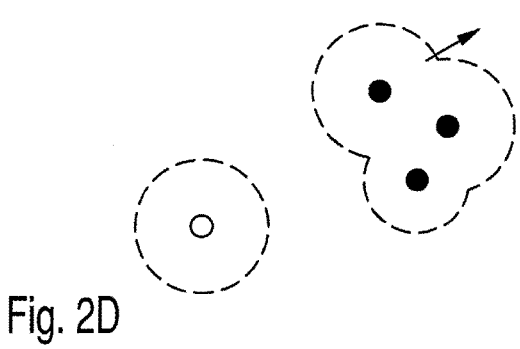
FIG. 2D a regional diagram of a fourth scenario of an ad-hoc network with nodes disposed inside and outside the ad-hoc network, according to one embodiment, and FIG. 3 a flow chart of the method for the effective identification of neighboring nodes in a mobile ad-hoc network, according to one embodiment.

The scenario in FIG. 2D represents the case that the original seeking node has moved out of the ad-hoc network again, since the three nodes originally disposed in the ad-hoc network have jointly removed themselves regionally from the original seeking node (see arrow), and the original seeking node is therefore positioned outside the transmission range relative to all three nodes of the ad-hoc network.

The invention is not restricted to the embodiment illustrated and the variants presented. In particular, all possible combinations of all features claimed in the claims, of all features disclosed in the description and of all features illustrated in the figures of the drawings are also covered by the embodiments of the invention. In particular, the features of the dependent method claims can also be realized in combination with the independent network claim.

The invention claimed is:

1. A method for the effective identification of neighboring nodes in a mobile ad-hoc network, wherein each node transmits within a given time raster a message signaling a presence of the node which is acknowledged through the transmission of an acknowledgement message by at least one node which receives the message signaling the presence for the first time,
    wherein the time raster in which the message signaling the presence is transmitted is varied by the node which is disposed outside the ad-hoc network,
    wherein a secured and/or encrypted symmetrical data transmission between at least two nodes disposed within the ad-hoc network is implemented as soon as one of the two nodes receives a further acknowledgement message to the node's transmitted acknowledgement message from the respectively other node,
    wherein departure of the node disposed within the ad-hoc network is possible only within the framework if the node shuts down its operation,
    wherein the time raster in which the message signaling the presence of the node is transmitted from the node disposed outside the ad-hoc network directly after a start-up of the node disposed outside the ad-hoc network,
    wherein the node disposed outside the ad-hoc network transmits the messages signaling its presence with a high value time raster and the time raster reduces successively until a minimal-value time raster is reached,
    wherein the minimal-value time raster is the time raster for transmission of message signaling the presence by any one of the nodes once, and
    wherein the minimal-value time raster is retained until the node disposed outside the ad-hoc network is integrated in the ad-hoc network.

2. The method according to claim 1, wherein directly after the node has identified that the node is now disposed outside the ad-hoc network, the node transmits the message signaling the presence of the node in a time raster with a comparatively high value, which is successively reduced until the minimal-value time raster is reached.

3. The method according to claim 1, wherein the acknowledgement message is transmitted directly after the reception of the message signaling the presence.

4. The method according to claim 3, wherein the acknowledgement message is transmitted immediately after the reception of the message signaling the presence.

5. The method according to claim 3, wherein the acknowledgement message is transmitted after the reception of the message signaling the presence with the addition of a statistical delay time associated in each case with the respective node.

6. The method according to claim 1, wherein the node disposed outside the ad-hoc network transmits a message signaling the presence within a previously specified, constant time raster from the time of the reception of the acknowledgement message.

7. The method according to claim 1, wherein the node disposed outside the ad-hoc network transmits a message signaling the presence within a previously specified, constant time raster from the time of the reception of a message signaling the presence of another node, which the node acknowledges with an acknowledgement signal.

8. The method according to claim 1, wherein the node is integrated in the ad-hoc network with at least one further node as soon as one of the two nodes receives the acknowledgement message to the node's transmitted message signaling the presence from the respectively other node.

9. The method according to claim 1, wherein the node is disposed within the ad-hoc network so long as it receives a further message signaling the presence of the node of the ad-hoc network within a previously specified time interval since the last reception time of the message signaling the presence of the node of the ad-hoc network.

10. The method according to claim 1, wherein the identification of neighboring nodes in the mobile ad-hoc network precedes a routing-planning according to an Optimised-Link-State-Routing protocol.

* * * * *